United States Patent [19]

Kitipornchai

[11] Patent Number: 4,586,550

[45] Date of Patent: May 6, 1986

[54] REINFORCING TIMBER

[75] Inventor: Sritawat Kitipornchai, Brookfield, Australia

[73] Assignee: University of Queensland, Queensland, Australia

[21] Appl. No.: 655,422

[22] Filed: Sep. 28, 1984

[30] Foreign Application Priority Data

Sep. 28, 1983 [AU] Australia .............................. PG1606

[51] Int. Cl.[4] ................................................ B27F 7/00
[52] U.S. Cl. .................................... 144/353; 144/344; 52/DIG. 6
[58] Field of Search ................... 52/DIG. 6, 693, 514; 144/353, 350, 352; 29/432

[56] References Cited

U.S. PATENT DOCUMENTS 3,686,809  8/1972  Lindal ................................. 144/353

FOREIGN PATENT DOCUMENTS 573858  4/1959  Canada .......................... 53/DIG. 6

Primary Examiner—Francis S. Husar
Assistant Examiner—Jorji M. Griffin
Attorney, Agent, or Firm—Schwartz, Jeffery, Schwaab, Mack, Blumenthal & Evans

[57] ABSTRACT

A method of reinforcing timber beams (15) by fixing sheet metal plates or strips (10) to the top and/or bottom of the beam (15) so that the plates or strips (10) are placed in tension after compression when a load is applied to the beam (15). Teeth (11) pressed out of the plates or strips (10) are fixed into the beam (15) by passing the assembly between pressure rollers or pads (16). The plates or strips (10) may extend over 40%–70% of the length of the beam (15) in the area of maximum deflection of the beam under the applied load to increase the stiffness of the beam by 50%–80%.

7 Claims, 3 Drawing Figures 4,586,550

REINFORCING TIMBER

BACKGROUND OF THE INVENTION (1) Field of the Invention

This invention relates to a method of, or apparatus for, reinforcing timber.

(2) Brief Description of the Prior Art

Timber is widely used in domestic and light engineering structures, as it is readily available in a wide variety of sizes and stress grades and can be easily worked (e.g. cut, notched and connected). In addition, it can be used with a pleasing aesthetic effect e.g. as exposed beams in ceilings. However bare timber is relatively weak both in strength and stiffness when compared with other building materials such as steel and is generally unsuitable for long span applications where relatively large sections, or expensive laminated beams, are required.

SUMMARY OF THE INVENTION

It is an object of the present invention to provide a method of, and/or apparatus for, strengthening timber beams to reduce their deflection under a given load.

It is a preferred object to strengthen the beams by applying and fixing metal plates to the top and/or bottom of the beams, the plates being placed in tension and/or compression as the beams are deflected.

It is a further preferred object to provide the plates at the section of the beams liable to maximum deflection when the load is applied. Other preferred objects will become apparent from the following description.

In one aspect, the present invention resides in a method for reinforcing a timber beam, including the step of fixing at least one length of metal reinforcing plate or strip to the top and/or bottom of the beam over at least a portion of the length of the beam, the plate or plates being adapted to be placed under tension and/or compression as the beam is deflected under an applied load.

Preferably the plates or strips are applied to both the top and bottom of the beam and are preferably fixed thereto by integral teeth pressed or formed substantially perpendicular to the plane of the plates or strips.

Preferably the plates or strips extend over approximately 10-100%, more preferably 40-70%, of the length of the beam and are preferably placed in the area of maximum deflection of the beam. Where a plurality of plates are used, they may be overlapped.

The strips may be drawn from coils and provided with the teeth e.g. by rotary punches, before being applied to the beams, the strips being pressed into the timber as they pass between pressure rolls or pads.

In a second aspect the present invention resides in an apparatus for reinforcing a timber beam including the metal plate(s) or strip(s) hereinbefore described.

In a third aspect, the present invention resides in a reinforcing timber beam incorporating the metal plate(s) or strip(s) hereinbefore described.

BRIEF DESCRIPTION OF THE DRAWINGS

To enable the invention to be fully understood, a number of preferred embodiments will now be described with reference to the accompanying drawings, in which.

DETAILED DESCRIPTION OF THE PREFERRED EMBODIMENTS

Figure 1:
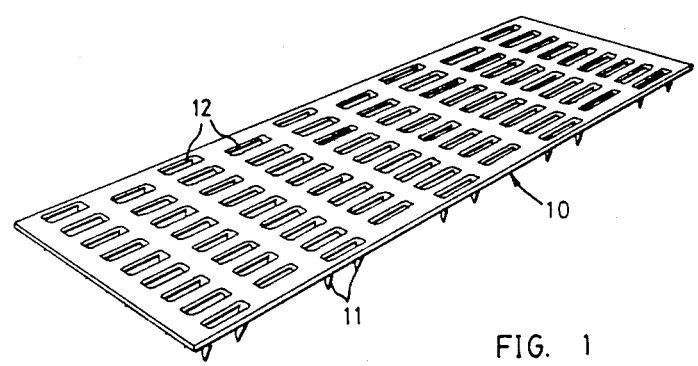
FIG. 1 is an upper perspective view of a length of the reinforcing plate.
Figure 2:
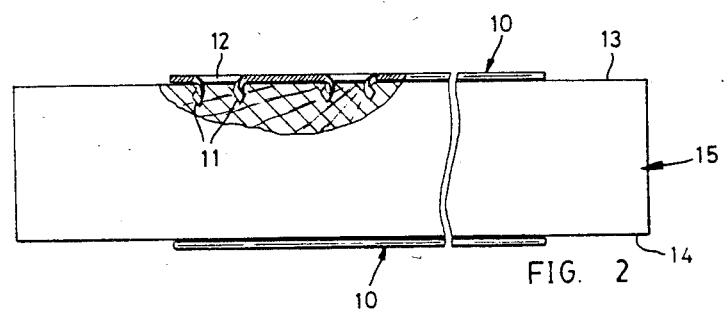
FIG. 2 is a part-sectional side view showing a timber beam reinforced by top and bottom plates.

Referring to FIG. 1, the reinforcing plate 10 is formed of light gauge sheet metal e.g. of a thickness of 0.5-3.0 mm. A plurality of teeth 11, integral with, and normal to the body of the plate, are punched out of the plate 10 and leave a series of offset recesses or holes 12 in the plate 10.

The plates 10 are applied to the top and bottom faces 13, 14 of a timber beam over e.g. 40-70% of the length of the beam 15 and the combination is passed between pressure rollers or pads to cause the teeth 11 to be driven into the beam 15.

Depending on the length of the plates 10 relative to the length of the beam 15, and the thickness of the plates 10, the deflection of the beam 15 for a given load may be reduced by e.g. 70-80%, indicating a marked increase in the stiffness of the beam 15. As the beam is deflected e.g. a downward force is applied to the centre of the beam 15, the top plate 10 is placed in compression and the bottom plate 10 is placed in tension in the manner of the end flanges of an I-beam section, the timber beam corresponding to the web of such a section.

It is not essential that the plate 10 extend the full length of the beam 15 as it has been calculated that an increase of the length of the plate from 40% to 70% of the length of the beam may increase the stiffness of the beam from 50% to 80% but the increase in the length of the plate from 70% to 100% (i.e. a 30% increase as before) may only increase the stiffness of the beam by a further 5%.

It is preferred that the plates be applied to both the top and the bottom of the beams. If this is not possible, it is preferred that the plates be applied to the face of the beam that is to be placed in tension by the applied load.

Figure 3:
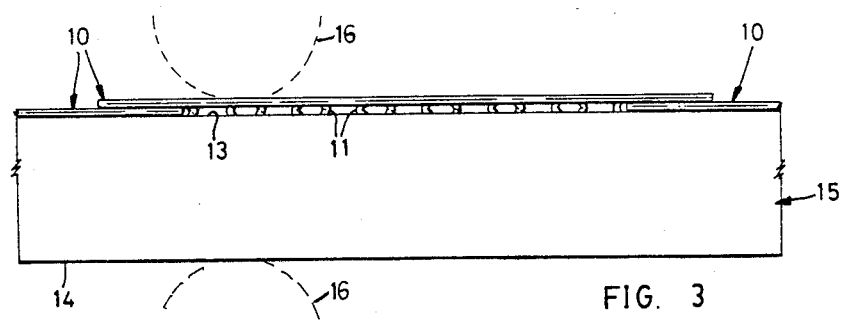
FIG. 3 is a side view of a timber beam reinforced by a series of overlapping top plates.

The plates 10 can be manufactured from, or applied to, the beams in a single strip. However, as shown in FIG. 3, the plates 10 can be fixed to the beam as an overlapping arrangement to provide the same effect as a continuous strip and further fasteners can be driven through the plates to secure them to the beam.

In a continuous production method in a factory, the sheet metal can be drawn from coils past rotary punches and fixed dies which form the teeth in the strips. The timber beams can be interposed between the strips and the metal strip/timber beam/metal strip combination passed between pressure rollers or pads to fix the strips to the beams, the strips being cut to the length of the beams. In certain applications, the beams may be bent or deflected before the strips or plates are applied to pretension the beams.

It will be readily apparent to the skilled addressee that the arrangement of the teeth 11 and slots 12 in the plates or strips may be varied to suit different applications and that the plates or strips can be secured by other fasteners e.g. nails or screws.

The metal reinforcing strips may be used for any timber sizes on stress grades and may be used on laminated beams to further increase their stiffness.

In selecting the thickness of the plates or strips it is preferred that the plates or strips will yield under load before the timber as a warning that the critical loading on the beam is being approached.

Various modifications and variations, and the potential applications for the reinforced beams, will be readily apparent to the skilled addressee without departing from the scope of the present invention as defined in the appended claims.

I claim:

1. A method of reinforcing a timber beam positioned transversely to an applied load acting downwardly on the beam intermediate the ends thereof and tending to deflect the beam intermediate its ends as a result of such applied load, said beam having top and bottom surfaces, the top surface being subjected to the loading, comprising the steps of:
   (a) providing at least one metal reinforcing plate having a plurality of teeth extending in the same direction perpendicularly to the plane of the body of said plate, and
   (b) mounting said plate on the top or bottom surface of said beam over a portion of the length of said beam by embedding said teeth in said beam, said plate when said beam is subjected to loading being placed under compression if applied to the top of said beam, or placed under tension if applied to the bottom of said beam, thereby increasing the stiffness of said beam and the ability to resist bending.

2. The method of claim 1 wherein plates formed with said teeth are mounted on both the top and bottom surfaces of said beam, said plates, under loading of said beam, being placed under compression and tension, respectively, thereby increasing the resistance of said beam to bending.

3. The method of claim 2 wherein said plates are mounted on said beam by applying pressure vertically in both directions to said plates and interposed beam, thereby embedding said teeth in said beam.

4. The method of claim 2, further including the step of positioning said plates in the area of maximum deflection of the beam under the applied load, and extending said plates over 10%–100% of the length of the beam.

5. The method of claim 4 wherein said plates extend over 40%–70% of the length of the beam to increase the stiffness of the beam by 50%–80% relative to the unreinforced beam.

6. The method of claim 2 wherein said beam is reinforced by a plurality of plates fixed in an overlapping arrangement, on one or both of the top and bottom surfaces of said beam.

7. The method of claim 2 wherein said plates are formed from imperforate coils of sheet metal, and further including the steps of punching teeth in said coil, passing lengths of coil with teeth formed thereon and positioned on the top and bottom of said beam through a pressure station where said teeth are embedded in said top and bottom surfaces of said beam, and cutting said coil lengths so as to be equal to the length of said beam.

* * * * *